Aug. 5, 1947.   P. H. METZLER   2,425,069
SLIP-SINKER
Filed Sept. 10, 1945
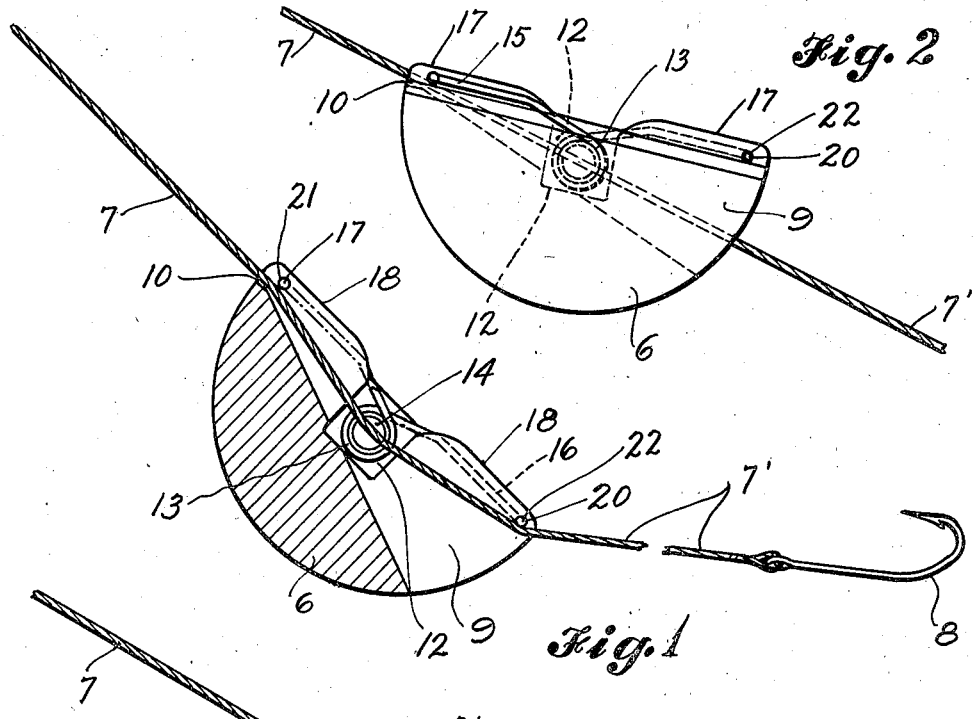
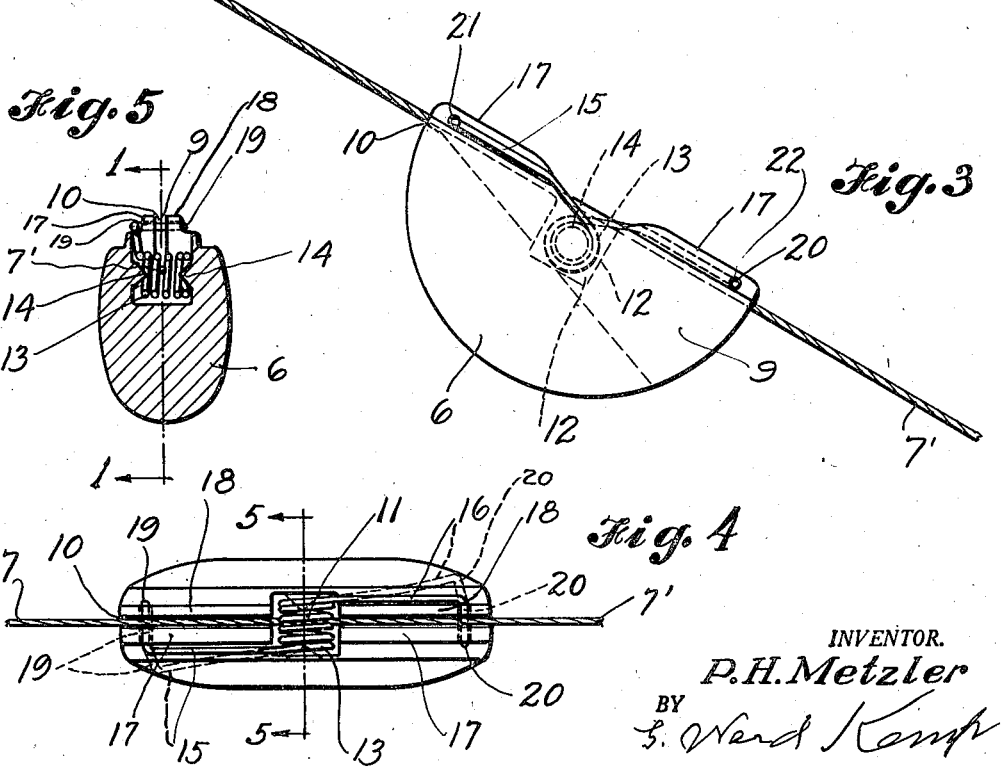
INVENTOR.
P. H. Metzler
BY
ATTORNEY Patented Aug. 5, 1947

2,425,069

UNITED STATES PATENT OFFICE 2,425,069

SLIP-SINKER

Phares H. Metzler, Seattle, Wash.

Application September 10, 1945, Serial No. 615,455

6 Claims. (Cl. 43—52)

This invention relates to slip sinkers for use on trolling lines for fishing, and particularly to such sinkers which will retain their position on the line against any slow hard pull, but will be released by any sudden jerk, as from a fish attempting to gain its release from the hook.

In the operation of trolling for fish, particularly for salmon in deep waters, heavy sinkers, often exceeding one pound in weight must be used on the lines at considerable distances above the hooks, which hooks trail approximately horizontally behind the sinkers.

Attempts have been made to provide sinkers that might be released by pulls on the line greater than exerted by the hook and ordinary lure spoons, as by a hooked fish. But in use the hooks sometimes catch against seaweed and other obstructions, which causes the lead to become released and it then slides down against the hook without notice to the operator and prevents fish from biting. One of the objects of this invention therefore, is to provide a slip sinker which will not become released by any slow hard pull as by seaweed or other inanimate objects, but which will be automatically released by the quick jerk of a fish against inertia of the weight of the sinker.

Attempts have also been made to connect lines to sinkers by wire clamps extended beyond the ends of the sinkers and also to provide slots from the base to near the tops of the sinkers for reeveways for lines, but such methods are ineffective for many reasons, including, that all projections from the sinkers catch and gather seaweed and prevent fish from biting and may be crushed against submerged rocks and by ordinary rough usage of the fishing gear in commercial fishing such as dropping and piling the weights, which crushes or dislocates both the sides of such sinkers, and also wires.

It is therefore another object of this invention to provide means for connecting the leads to lines at any desired position thereon by means of wires or clamps built within the walls of the lead to provide smooth surfaces for passage through seaweed, and obstructions, and to provide a diagonal slot along the top of the lead, for operation of a line, with most of the weight of the lead below the slot, to resist rough usage and to facilitate the release of the sinker by the weight thereof below the level of the trailing line, as by a jerk on the trailing line against the sagging weight of the lead.

With these and other objects to be hereinafter stated, I have illustratively exemplified my invention by the accompanying drawings, of which:

Figure 1 is a side elevation of the sinker partly in section and showing the line in the general position for trolling taken on line 1—1, Fig. 5.

Figure 2 is a similar view showing position of the line for threading between coils of the clamp.

Figure 3 shows another elevation and the position of the line after being jerked from the clamp.

Figure 4 is a plan of the sinker with the line threaded between the coils and confined in the slot by spring latches across each end of the sinker. Figure 5 is a cross section view taken on line 5—5 of Figure 4.

Like numerals on the different figures represent like parts. 6 represents the sinker body which is ordinarily formed of lead, and of suitable weight according to the size of the line 7 and depth to which the hook 8 is to be drawn along in deep water from a boat for trolling as for salmon. 9 represents a slot or channel longitudinally and centrally extended through the upper portion of the sinker, for passage of the line or reeveway therefor. This slot is restricted in size at the front end to provide a mere throat, 10, for free movement of the line therethrough and thence the floor of the slot slopes downward to the rear end of the sinker to a point approximately one-half the depth thereof, to provide space for movement of the line both longitudinally and vertically.

A well 12 is extended down centrally in the sinker within which is mounted crosswise a plurality of coils of resilient wire 13 which are normally retained therein by bosses 14 extended inward toward each other from the sides of the well and over which the coils may be positioned by manual compression. Two central coils 11 act as clamp jaws for resiliently gripping the line at any desired point after it has been manually drawn down between the coils. The opposite ends of the wire coil are preferably extended respectively forward and back as 15 and 16 and disposed along the outerside of ribs 17 and 18 which are extended above the body on each side of the slot as guards for the wires to prevent obstacles or seaweed from interfering therewith. The tips 19 and 20 of the wires are bent inward at right angles and slidably disposed through holes 21 and 22 near the front ends of the ribs. The angular tips extend over and across the open top of the channel and there provide limits for the upward movement of the line and prevent the loss of the sinker therefrom. These tips are withdrawn manually from the holes for inserting the line or removing the same, easily even in frigidly cold weather. The ends of the ribs beyond the holes are rounded to effectually guard the ends of the wires and prevent any injury thereto from rough usage or contact with rocks or other obstructions and also prevent lodgment of seaweed on the wires or sinker and facilitate the movement of the sinker through such obstructions.

In operation the sinker is connected at any desired point on the line by disposing the line in the channel after opening the latches which are resiliently seated in the cross holes; and the line is then drawn down between the coils 11 which serve as a resilient clamp for normally retaining the line therein, the space between such coils 11 being in alignment with such slot and the hook end 7' of the line being drawn down to the floor of the channel for lacing between such coils as seen in Fig. 2. When drawn along in trolling the rear end of the line behind the clamp rises against the rear latch 20 in angular relation with the line ahead of the clamp as seen in Fig. 1. The tension of the clamp is sufficient to support the weight of the sinker in such position against the normal resistance of the hook, and in event the hook catches against seaweed or other such obstruction any ordinary slowly increased pull on the hook by the line from the boat gradually causes the sinker to rise, and portions of the line in front of and behind the clamp to come into alignment or straightened without becoming loosened from the sinker as also seen in Fig. 2.

However, when the rear end of the line suddenly is jerked by a fish, the force of inertia of the lead sinker below is greater than the tension of the clamp and the line is jerked from the coils and into alignment with the forward portion of the line and then slides down against the hook, when the operator pulls up the line.

Having described my invention I claim as new:

1. A slip sinker for a trolling line comprising a body member having a centrally disposed well extended therein from its top, and having a slot longitudinally extended through its body for a fish line, said slot sloping downward from the front end to the rear end near the rear center of said body to facilitate the line being drawn down for connecting the same, and a helically wound spring mounted in the well and having its central convolutions in alignment with the groove for maintaining the fish line thereby against the force of all slow pulls on the line and releasable in event of sudden jerks on the line, the ends of a spring wire from the coils extending respectively to the opposite ends of the sinker and there having a bend at right angles across the slot to prevent the loss of the sinker from the line.

2. A slip sinker for a trolling line comprising a body member with a longitudinal channel centrally disposed therein with a slope and increased depth from near the front to the rear end at a point above the weight center of the body for sustaining a line therein at all times near the front end and to enable the line to be depressed in the rear portion of the slot, clamp means mounted within the sinker body in alignment with the slot and adapted for normally sustaining the sinker in a determined position on the line against the force of any slow pull on the hook behind the sinker and adapted to release the sinker on the line against the gravity inertia of the sinker by a jerk, and adjustable wires forming latches across the slot at each end thereof to limit the upward movement of the line in the slot and the travel of the line therein and to prevent the separation of the line from the sinker.

3. A slip sinker for a trolling line, comprising a body member having a channel longitudinally disposed centrally therethrough along the upper portion thereof for the line, a clamp member mounted adjacent the floor of the slot in alignment therewith for connecting the line to the sinker, ribs extended above and parallel with the sides of the slot and provided with holes through the ends thereof at right angles thereto, and resilient wires connected at one of their ends adjacent the central part of the body and extended therefrom forward and back respectively along the outer sides of the ribs, the tips of the wires each having a bend at right angles to the ribs and adapted to slidably operate in the holes across the slot to provide bars across the top of the slot to prevent the escape of the sinker from the line.

4. A slip sinker for a trolling line, comprising a body member provided with a slot extended longitudinally therethrough along the upper portion thereof forming a passageway for the line, resilient clamp means mounted within the body in alignment with the slot for adjustably connecting the sinker to the line at any desired point, and resilient latches adjustably disposed within the limits of the body through and across the upper portion thereof to facilitate assembling of a sinker and line and to prevent the separation thereof; to provide a slip sinker for freely passing through seaweed and obstructions.

5. A slip-sinker for a trolling fish line, comprising, a relatively heavy body, and having a reeveway extended longitudinally along the upper portion thereof for operation of the line therethrough, the front end of the reeveway being limited in dimensions for free passage of the line therein adjacent to the top of the body, said reeveway being deepened backward through the body for vertical movement of the line, and clamping means extended above the floor of the reeveway approximately midway the length of the body for normally retaining the sinker at a predetermined point on the line against the force of any slow pull on the hook end of the line, said clamp being further adapted to release the line when the hook end thereof is jerked against the weight and inertia of the sinker.

6. In a slip sinker for a trolling line, including, a relatively heavy body having a guideway along the top thereof for the line, guards over the guideway at the front and rear end of the body to limit upward travel of the line, and a clamp mounted in alignment with the guideway and in spaced position behind the front end of the body and at a relatively great distance below the level of the rear guard, for sustaining the line on a downward slope from the front end of the body to the clamp and adapted to raise the sinker and bring the hook end of the line to the same plane as the line ahead on any slow pull, and adapted to release the line from the clamp against the rear guard above and free the sinker on the force of any sudden jerk.

PHARES H. METZLER.

REFERENCES CITED

The following references are of record in the file of this patent:

UNITED STATES PATENTS

| Number | Name | Date |
| --- | --- | --- |
| 631,197 | Bourke | Aug. 15, 1899 |